(12) United States Patent
Mitsch et al.

(10) Patent No.: US 7,014,690 B2
(45) Date of Patent: Mar. 21, 2006

(54) EXPANDABLE DESICCANT ELEMENT

(75) Inventors: Matthew D. Mitsch, Pittsburgh, PA (US); Brian L. Cunkelman, Blairsville, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 245 days.

(21) Appl. No.: 10/741,050

(22) Filed: Dec. 18, 2003

(65) Prior Publication Data

US 2005/0132887 A1  Jun. 23, 2005

(51) Int. Cl.
*B01D 53/04* (2006.01)
*B01D 53/28* (2006.01)

(52) U.S. Cl. .............................. 96/121; 34/80; 55/475; 55/515; 55/DIG. 17; 96/130; 96/135; 96/137; 96/149; 96/153; 210/282

(58) Field of Classification Search ............. 34/80–82; 55/475, 512, 515–519, DIG. 17; 96/108, 96/121, 130–138, 142, 149, 515, 153, 151, 96/154; 210/282
See application file for complete search history.

(56) References Cited

U.S. PATENT DOCUMENTS

| | | | |
|---|---|---|---|
| 3,240,567 A * | 3/1966 | Caparreli et al. ............ 206/525 |
| 3,853,519 A * | 12/1974 | York, Jr. ...................... 96/129 |
| 3,937,622 A | 2/1976 | Hewitt et al. |
| 4,361,425 A | 11/1982 | Hata |
| 5,019,254 A * | 5/1991 | Abrevaya et al. ........... 210/169 |
| 5,423,129 A | 6/1995 | Castle et al. |
| 5,604,991 A | 2/1997 | Castle et al. |
| 5,662,727 A | 9/1997 | Castle et al. |
| 5,673,493 A | 10/1997 | Kazakis et al. |
| 5,685,896 A | 11/1997 | Castle et al. |
| 5,689,893 A | 11/1997 | Mitsch |
| 5,715,621 A | 2/1998 | Mitsch |
| 5,785,742 A | 7/1998 | Mitsch |
| 5,876,487 A * | 3/1999 | Dahlgren et al. ............... 96/13 |
| 5,897,691 A * | 4/1999 | Hunsinger et al. ............ 96/108 |
| 5,899,435 A | 5/1999 | Mitsch et al. |
| 5,901,459 A | 5/1999 | Trapp et al. |
| 5,901,464 A | 5/1999 | Kazakis et al. |
| 5,914,456 A * | 6/1999 | LeConey et al. ............. 96/121 |
| 5,930,910 A | 8/1999 | Trapp et al. |
| 5,961,698 A | 10/1999 | Dossaji et al. |
| 5,967,179 A | 10/1999 | Kazakis et al. |
| 5,983,516 A | 11/1999 | Trapp et al. |
| 6,000,432 A | 12/1999 | Trapp et al. |
| 6,010,558 A * | 1/2000 | Ackland ....................... 95/141 |
| 6,014,820 A | 1/2000 | Jones et al. |
| 6,070,339 A | 6/2000 | Cunkelman |
| 6,071,321 A | 6/2000 | Trapp et al. |
| 6,089,262 A | 7/2000 | Hart |

(Continued)

FOREIGN PATENT DOCUMENTS

DE  34 43 274 A1 *  5/1986

(Continued)

*Primary Examiner*—Robert H. Spitzer
(74) *Attorney, Agent, or Firm*—The Webb Law Firm

(57) ABSTRACT

An expandable desiccant element for removal of moisture from an air stream. Such expandable desiccant element includes at least one first expandable containment section capable of expanding a first predetermined amount, at least one second expandable containment section capable of expanding a second predetermined amount which is greater than the first predetermined amount connected to the first expandable containment section. Such at least one first expandable containment section and at least one second expandable containment section forming a predetermined shape.

21 Claims, 1 Drawing Sheet

U.S. PATENT DOCUMENTS

| | | |
|---|---|---|
| 6,128,825 A | 10/2000 | Cunkelman |
| 6,139,609 A * | 10/2000 | Eimer et al. ............... 96/117.5 |
| 6,167,956 B1 | 1/2001 | Bostedo |
| 6,170,288 B1 * | 1/2001 | Incorvia ..................... 62/509 |
| 6,203,601 B1 | 3/2001 | Trapp et al. |
| 6,402,811 B1 * | 6/2002 | Shanks et al. ................ 95/90 |
| 6,467,185 B1 | 10/2002 | Mitsch et al. |

FOREIGN PATENT DOCUMENTS

| | | | |
|---|---|---|---|
| EP | 0399730 A1 | * | 11/1990 |
| GB | 2063095 | * | 6/1981 |
| JP | 59-147615 | * | 8/1984 |
| JP | 5-68844 A | * | 3/1993 |
| JP | 5-76720 A | * | 3/1993 |

* cited by examiner

US 7,014,690 B2

EXPANDABLE DESICCANT ELEMENT

FIELD OF THE INVENTION

The present invention generally relates to drying agents. More particularly, the invention relates to a drying agent for use in a regenerative desiccant air dryer.

BACKGROUND OF THE INVENTION

Air dryers are commonly used to remove moisture from a compressed air stream so that a minimum of moisture is introduced into the devices powered by the compressed air. Moisture can have a detrimental impact on such downstream devices, such as ice blockage, rust, and lack of proper lubrication. It is highly important in a compressed air system to provide the driest air possible to the downstream devices, and is critical for the safe and proper operation of locomotives and rail cars.

There are several designs of air dryers used on locomotives today, and a regenerative desiccant air dryer is the most common. The periodic replacement of the drying agent is a required maintenance procedure, and can be a difficult, messy, and wasteful process with prior art dryers, since in some types the drying agent is poured loosely into the dryer tanks. Other prior art dryers offer cartridges that have the drying agent contained within them, but these cartridges must be made to exacting tolerances so that the wet air does not pass around the cartridge. This makes the cartridge more difficult and expensive to manufacture, but eases the maintenance process.

SUMMARY OF THE INVENTION

In one aspect, the invention generally provides an expandable desiccant element for removal of moisture from an air stream. Such expandable desiccant element includes at least one first expandable containment section capable of expanding a first predetermined amount, at least one second expandable containment section capable of expanding a second predetermined amount which is greater than such first predetermined amount connected to the first expandable containment section. Such at least one first expandable containment section and at least one second expandable containment section forming a predetermined shape. There is a means for removing moisture from such air stream disposed within such containment sections.

In another aspect, the invention generally provides an expandable desiccant element in combination with a regenerative desiccant air dryer. The regenerative desiccant air dryer has a dehydrating dryer, a regenerating dryer, outlet check valves, inlet check valves, solenoid valves, a pre-coalescer, purge valves, and a drain valve. The improvement comprises an expandable desiccant element including at least one first expandable containment section capable of expanding a first predetermined amount and at least one second expandable containment section capable of expanding a second predetermined amount which is greater than such first predetermined amount connected to the first expandable containment section and forming a predetermined shape. The combination further includes a means for removing moisture from such air stream disposed within such containment sections.

OBJECTS OF THE INVENTION

It is therefore the primary object of the present invention to provide an expandable desiccant element that offers a reduction in the amount of wet air passing around it.

It is another object of the present invention to provide an expandable desiccant element that offers the ability to expand and contract.

It is a further object of the present invention to provide an expandable desiccant element that offers less complicated manufacturing methods.

It is still another object of the present invention to provide an expandable desiccant element that offers ease of insertion and removal.

In addition to the above-described objects and advantages of the expandable desiccant element, various other objects and advantages of the present invention will become more readily apparent to the persons who are skilled in the same and related arts from the following more detailed description of the invention, particularly, when such description is taken in conjunction with the attached drawing figures and the appended claims.

DETAILED DESCRIPTION OF THE PRESENTLY PREFERRED EMBODIMENT

Figure 3:
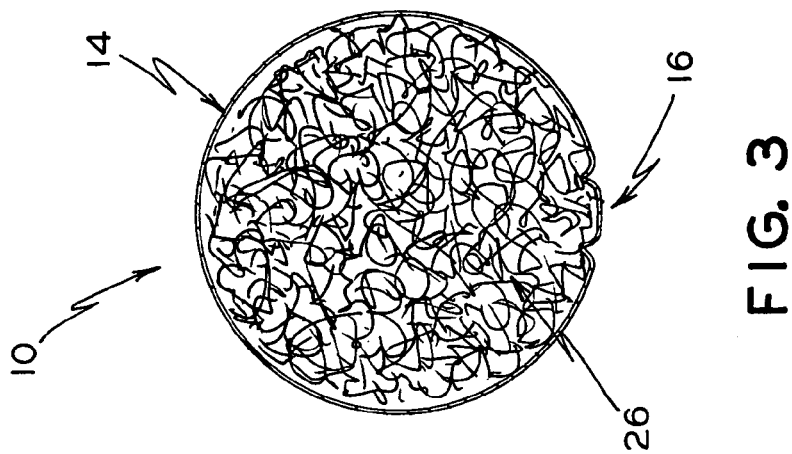
FIG. 3 is a top sectional view of an expandable desiccant element.

Prior to proceeding to a much more detailed description of the present invention, it should be noted that identical components which have identical functions have been identified with identical reference numerals throughout the several views illustrated in the drawing figures for the sake of clarity and understanding of the invention.

Figure 1:
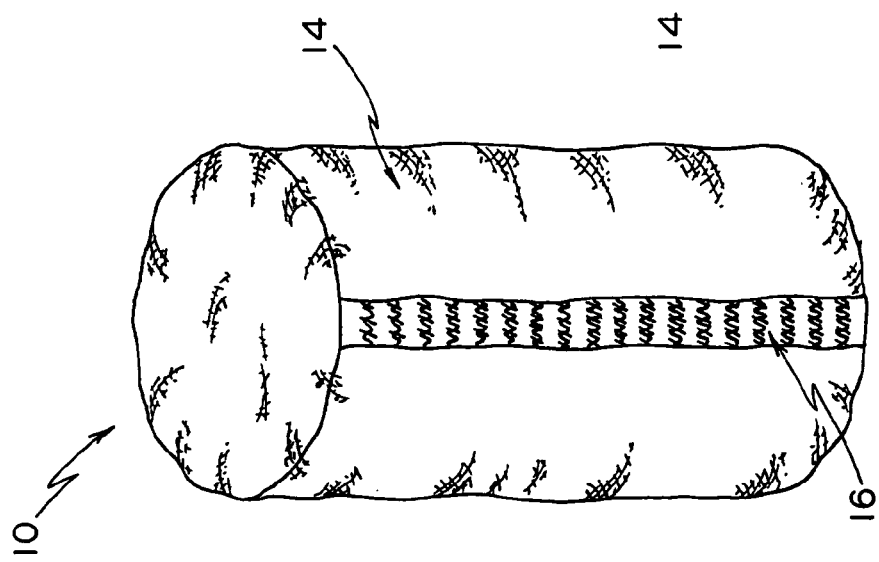
FIG. 1 is a side view of an expandable desiccant element in an unexpanded state.

Referring initially to FIG. 1 an expandable desiccant element constructed according to a presently preferred embodiment of the invention is generally designated 10. The expandable desiccant element 10 includes at least one first expandable containment section 14 capable of expanding a first predetermined amount and at least one second expandable containment section 16 capable of expanding a second predetermined amount which is greater than such first predetermined amount connected to the first expandable containment section 14. The first expandable section 14 and second expandable section 16 are sewn together in a presently preferred embodiment.

The second expandable containment section 16 is made from a material with at least about a 30 percent expansion capability.

In a presently preferred embodiment, the second expandable containment section 16 is made from at least one of a Lycra material and an equivalent. The first expandable containment section 14 is made from at least one of a breathable felt material and an equivalent in a presently preferred embodiment.

The first expandable containment section 14 and second expandable containment section 16 form a predetermined shape. In a presently preferred embodiment, the predetermined shape formed by the first expandable containment section 14 and the second expandable containment section 16 is substantially cylindrical. The substantially cylindrical shape has a length of between about 11 inches and about 11.3 inches in an unexpanded state, and has a diameter of between about 4.1 and about 4.25 inches in an unexpanded state. A centrally located portion of such substantially cylindrical shape has a diameter of at least about 4.31 inches in an expanded state.

Further included in the expandable desiccant element 10 is a means 26 disposed within the containment sections for removing moisture from such air stream. Such means 26 for removing moisture is a drying agent. In a presently preferred embodiment, the drying agent is at least one of a molecular sieve and activated alumina.

Figure 2:
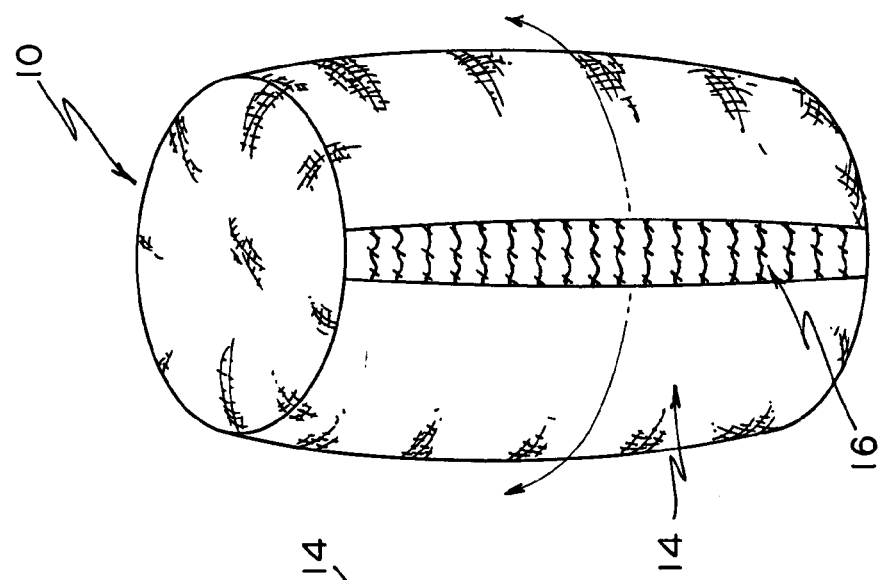
FIG. 2 is side view of an expandable desiccant element in an expanded state.

Referring to FIGS. 1, 2, and 3 there is an expandable desiccant element 10 in combination with a regenerative desiccant air dryer (not shown). The regenerative desiccant air dryer includes a dehydrating dryer, a regenerating dryer, outlet check valves, inlet check valves, solenoid valves, a pre-coalescer, purge valves, and a drain valve. The improvement includes an expandable desiccant element 10 having at least first expandable containment section 14 capable of expanding a first predetermined amount, and at least one second expandable containment section 16 capable of expanding a second predetermined amount which is greater than such first predetermined amount connected to such first expandable containment section 14 and forming a predetermined shape.

There is a means 26 disposed within the containment sections of the expandable desiccant element for removing moisture from such air stream. Such means 26 for removing moisture is a drying agent, and in a presently preferred embodiment, the drying agent is at least one of a molecular sieve and activated alumina.

In this combination, the second expandable containment section 16 of the expandable desiccant element 10 is made from a material with at least about a 30 percent expansion capability, and in a presently preferred embodiment, the second expandable containment section 16 is made from at least one of a Lycra brand elastomeric material and an equivalent. The first expandable containment section 14 of the expandable desiccant element 10 in this combination is made from at least one of a breathable felt material and an equivalent in a presently preferred embodiment.

The predetermined shape formed by the first expandable section 14 and second expandable outer section 16 is substantially cylindrical, and the substantially cylindrical shape has a length of between about 11 inches and about 11.3 inches in an unexpanded state. The substantially cylindrical shape further has a diameter of between about 4.1 and about 4.25 inches in an unexpanded state, and has a diameter of at least about 4.31 inches in an expanded state. In the expanded state, a centrally located portion of the expandable desiccant element 10 will be pressed adjacent the inner wall (not shown) of a holding tank (not shown) for the expandable desiccant element 10. When the expandable desiccant element 10 is pressed adjacent the holding tank inner wall, such stream of moist air will be forced through the expandable desiccant element 10 such that the drying agent 26 can remove moisture from the air stream.

While the present invention has been described by way of a detailed description of a particularly preferred embodiment, it will be readily apparent to those of ordinary skill in the art that various substitutions of equivalents may be affected without departing from the spirit or scope of the invention set forth in the appended claims.

We claim:

1. An expandable desiccant element for removal of moisture from an air stream, said expandable desiccant element comprising: (a) at least one first expandable containment section capable of expanding a first predetermined amount; (b) at least one second expandable containment section capable of expanding a second predetermined amount which is greater than said first predetermined, amount connected to said first expandable containment section and forming a predetermined shape; (c) a means for removing moisture from such air stream disposed within said containment sections.

2. An expandable desiccant element for removal of moisture from an air stream, according to claim 1, wherein said at least one second expandable containment section is made from a material with at least about a 30 percent expansion capability.

3. An expandable desiccant element for removal of moisture from an air stream, according to claim 2, wherein said at least one second expandable containment section is made from at least one of an elastomeric material and an equivalent.

4. An expandable desiccant element for removal of moisture from an air stream, according to claim 1, wherein said at least one first expandable containment section is made from at least one of a breathable felt material and an equivalent.

5. An expandable desiccant element for removal of moisture from an air stream, according to claim 1, wherein said means for removing moisture is a drying agent.

6. An expandable desiccant element for removal of moisture from an air stream, according to claim 5, wherein said drying agent is at least one of a molecular sieve and activated alumina.

7. An expandable desiccant element for removal of moisture from an air stream, according to claim 1, wherein said predetermined shape formed by said at least one first expandable containment section and said at least one second expandable containment section is substantially cylindrical.

8. An expandable desiccant element for removal of moisture from an air stream, according to claim 7, wherein said substantially cylindrical shape has a length of between about 11 inches and about 11.3 inches in an unexpanded state.

9. An expandable desiccant element for removal of moisture from an air stream, according to claim 7, wherein said substantially cylindrical shape has a diameter of between about 4.1 and about 4.25 inches in an unexpanded state.

10. An expandable desiccant element for removal of moisture from an air stream, according to claim 9, wherein a centrally located portion of said substantially cylindrical shape has a diameter of at least about 4.31 inches in an expanded state.

11. An expandable desiccant element for removal of moisture from an air stream, according to claim 1, wherein said at least one first expandable section and said at least one second expandable section are sewn together.

12. In combination with a regenerative desiccant air dryer having a dehydrating dryer, a regenerating dryer, outlet check valves, inlet check valves, solenoid valves, a pre-coalescer, purge valves, and a drain valve, the improvement comprising an expandable desiccant element including: (a) at least one first expandable containment section capable of expanding a first predetermined amount; (b) at least one second expandable containment section capable of expanding a second predetermined amount which is greater than said first predetermined amount connected to said first expandable containment section and forming a predetermined shape; (c) a means for removing moisture from such air stream disposed within said containment sections.

13. The combination according to claim 12, wherein said at least one second expandable containment section is made from a material with at least about a 30 percent expansion capability.

14. The combination according to claim 12, wherein said at least one second expandable containment section is made from at least one of an elastomeric material and an equivalent.

15. The combination according to claim 12, wherein said at least one first expandable containment section is made from at least one of a breathable felt material and an equivalent.

16. The combination according to claim 12, wherein said means for removing moisture is a drying agent.

17. The combination according to claim 16, wherein said drying agent is at least one of a molecular sieve and activated alumina.

18. The combination according to claim 17, wherein said predetermined shape formed by said at least one first expandable section and said at least one second expandable outer section is substantially cylindrical.

19. An expandable desiccant element for removal of moisture from an air stream, according to claim 18, wherein said substantially cylindrical shape has a length of between about 11 inches and about 11.3 inches in an unexpanded state.

20. An expandable desiccant element for removal of moisture from an air stream, according to claim 18, wherein said substantially cylindrical shape has a diameter of between about 4.1 and about 4.25 inches in an unexpanded state.

21. An expandable desiccant element for removal of moisture from an air stream, according to claim 18, wherein a centrally located portion of said substantially cylindrical shape has a diameter of at least about 4.31 inches in an expanded state.

* * * * *